(12) United States Patent
Song

(10) Patent No.: US 12,737,309 B2
(45) Date of Patent: Sep. 15, 2026

(54) SEMICONDUCTOR MEMORY DEVICE WITH SIGNALED COMMAND/ADDRESS INVERSION

(71) Applicant: Micron Technology, Inc., Boise, ID (US)

(72) Inventor: Keun-Soo Song, Yokohama (JP)

(73) Assignee: Micron Technology, Inc., Boise, ID (US)

(*) Notice: Subject to any disclaimer, the term of this patent is extended or adjusted under 35 U.S.C. 154(b) by 34 days.

(21) Appl. No.: 18/789,677

(22) Filed: Jul. 31, 2024

(65) Prior Publication Data

US 2025/0117344 A1 Apr. 10, 2025

Related U.S. Application Data

(60) Provisional application No. 63/542,296, filed on Oct. 4, 2023.

(51) Int. Cl.
*G06F 13/16* (2006.01)

(52) U.S. Cl.
CPC ...... *G06F 13/1689* (2013.01); *G06F 13/1657* (2013.01)

(58) Field of Classification Search
None
See application file for complete search history.

(56) References Cited

U.S. PATENT DOCUMENTS 7,495,587 B2 * 2/2009 Bae ...................... G11C 7/1006 341/55
7,869,525 B2 * 1/2011 Macri ................... H03L 7/0816 710/305
10,204,670 B2 * 2/2019 Kim .................... G11C 11/1693
10,861,508 B1 * 12/2020 Mathur ................ G11C 7/1084
2005/0108468 A1 * 5/2005 Hazelzet ............. G06F 13/4243 711/105
2006/0053243 A1 * 3/2006 David ................. G06F 13/4086 710/305
2017/0255404 A1 * 9/2017 Vergis ..................... H01L 24/00
2019/0065090 A1 * 2/2019 Kandikonda ........... G06F 12/02
2023/0062952 A1 * 3/2023 Jeong ..................... G11C 7/109
2023/0376414 A1 * 11/2023 Kim .................... G06F 11/1048

* cited by examiner

*Primary Examiner* — Yaima Rigol
(74) *Attorney, Agent, or Firm* — Dorsey & Whitney LLP

(57) ABSTRACT

Disclosed are methods, systems, and apparatuses for semiconductor memory devices (e.g., dynamic random access memory (DRAM)) that include a command/address inversion (CAI) input signal indicating whether command/address inputs to the memory devices are inverted. The CAI input signal may be generated by a memory controller, a registering clock driver (RCD), or other component coupled to the memory devices, and the component may generate the CAI input signal differently for the different memory devices to which the component is coupled. As described herein, the component may dynamically generate the CAI input signal based on the values of the command/address inputs so as to reduce power consumption by the memory devices while retaining signal integrity.

20 Claims, 5 Drawing Sheets

SEMICONDUCTOR MEMORY DEVICE WITH SIGNALED COMMAND/ADDRESS INVERSION

CROSS-REFERENCE TO RELATED APPLICATION(S)

The present application claims priority to U.S. Provisional Patent Application No. 63/542,296, filed Oct. 4, 2023, the disclosure of which is incorporated herein by reference in its entirety.

TECHNICAL FIELD

The present disclosure generally relates to a memory device, and more specifically relates to a memory device that inverts a command/address input based on a dynamic command/address inversion signal.

BACKGROUND

Memory devices are widely used to store information related to various electronic devices such as computers, wireless communication devices, cameras, digital displays, and the like. Memory devices may be volatile or non-volatile and can be of various types, such as magnetic hard disks, random access memory (RAM), read-only memory (ROM), dynamic RAM (DRAM), synchronous dynamic RAM (SDRAM), and others.

Information is stored in various types of RAM by charging a memory cell to have different states. Improving RAM memory devices, generally, can include increasing memory cell density, increasing read/write speeds or otherwise reducing operational latency, increasing reliability, increasing data retention, reducing power consumption, or reducing manufacturing costs, among other metrics.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
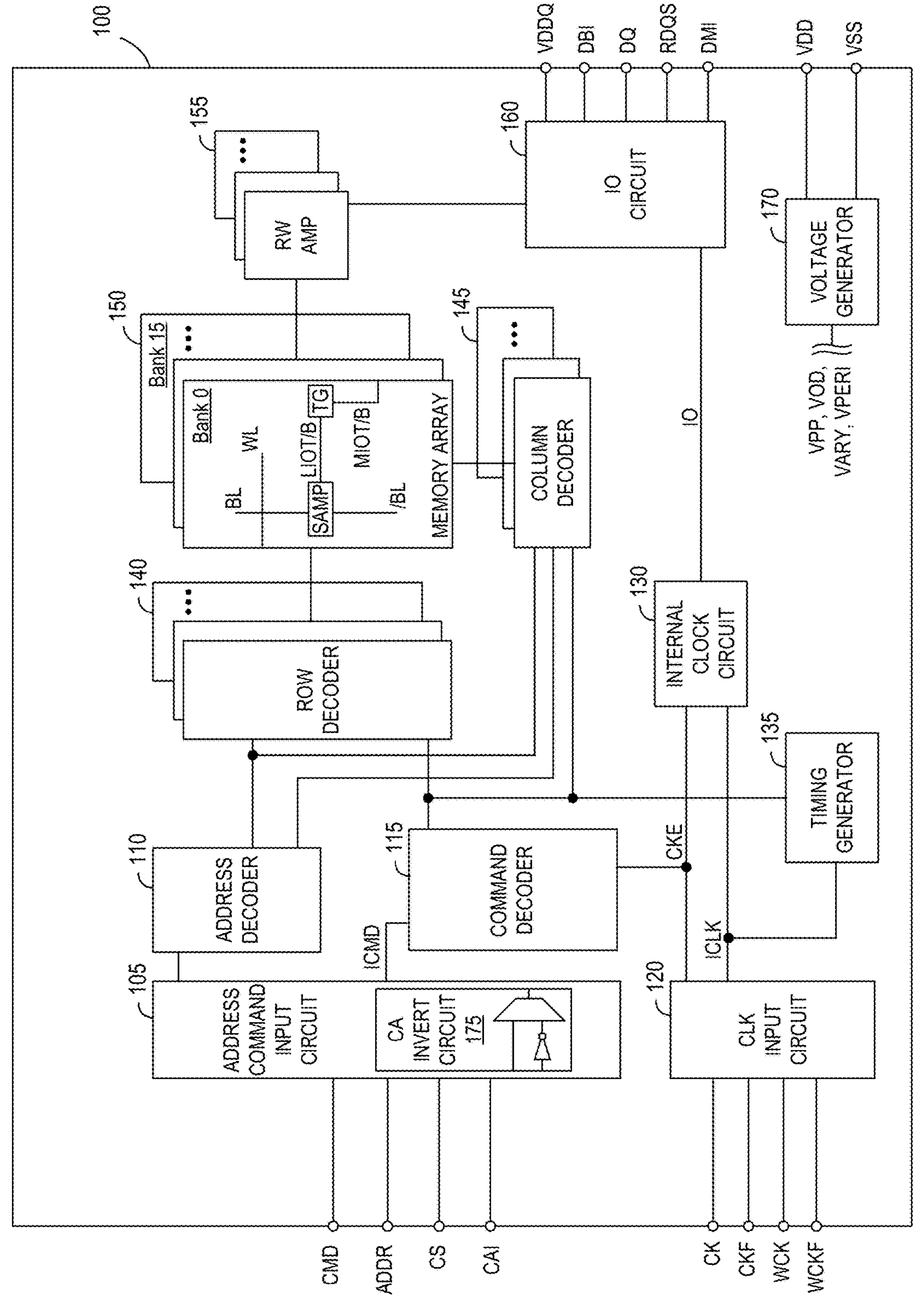
FIG. 1 illustrates a simplified block diagram schematically illustrating a memory device in accordance with an embodiment of the present technology.

Disclosed are methods, systems, and apparatuses for semiconductor memory devices (e.g., dynamic random access memory (DRAM)) that include a command/address inversion (CAI) input signal indicating whether command/address inputs to the memory devices are inverted. The CAI input signal may be generated by a memory controller, a registering clock driver (RCD), or other component coupled to the memory devices, and the component may generate the CAI input signal differently for the different memory devices to which the component is coupled. As described herein, the component may generate the CAI input signal based on the values of the command/address inputs so as to reduce power consumption by the memory devices while retaining signal integrity.

In systems with electronic devices operating at high frequency, impedance mismatches on an interconnect (e.g., between an electronic device transmitting a signal, and an electronic device receiving the signal, over the interconnect) can negatively impact signal integrity. That is, the signal as received by the receiving electronic device, over the interconnect, may be distorted. Electronic devices therefore typically "terminate" high-speed interconnects (e.g., at or within the receiving electronic device) to match the impedance of the transmitting electronic device, thereby improving signal integrity. Resistors and/or transistors with known turn-on resistances (collectively, "resistors") can be used to terminate the high-speed interconnects, and different combinations of resistors having different resistances may be used depending on the impedance of the transmitting electronic device.

Memory devices, such as DRAM, typically use on-die termination (ODT), in which the terminating resistors are inside the memory devices themselves. More specifically, the memory devices may use VDD-based ODT, in which one node of a terminating resistor is coupled to VDD (e.g., the positive supply voltage), and another node of the terminating resistor is coupled to the signal line being terminated. Further, ODT draws different amounts of power depending on the type of ODT used and the value of the signal being terminated. In particular, with VDD-based ODT, more power is drawn when the signal being terminated has a logical value of 0 (e.g., VSS), because that creates a path from VDD to VSS (through the terminating resistor) through which current can flow. In contrast, relatively little power is drawn when the signal being terminated has a logical value of 1 (e.g., VDD) with VDD-based ODT. That is, when a multi-bit bus is terminated with VDD-based ODT, the worst-case scenario, with respect to the described power draw, is when the bus is all zeros. It will be appreciated that the situations may be reversed for other types of ODT (e.g., VSS-based ODT). Furthermore, the amounts of power that may be drawn through the ODT circuits can be significant.

Memory devices, such as DRAM, typically include command/address (CA) inputs, which provide the command and/or address information for operations to be performed by the memory devices. Generally, the memory device has multiple CA inputs forming a multi-bit CA bus input. For example, memory devices that comply with certain versions of the Double Data Rate (DDR) SDRAM standard, such as DDR5, may have a 14-bit CA bus input (e.g., CA [13:0]). It will be appreciated that other memory devices may have a wider CA bus input (formed from more bits) or a narrower CA bus input (formed from fewer bits). Furthermore, multiple memory devices on a memory module (e.g., a dual in-line memory module, or DIMM) may be required to perform the same operation at the same time, and therefore the multiple memory devices on a memory module may be coupled to the same CA bus of the memory module (or, as described below, logical equivalents). Additionally, the memory devices may support ODT for the CA bus, which may be configurable. That is, ODT for the CA bus may be disabled, enabled, and/or enabled with different resistances, depending on the impedance of the electronic device transmitting over the CA bus (e.g., a memory controller).

It has been observed that the values on the CA bus are effectively randomly distributed (e.g., in typical use there is no discernible pattern of ones and zeros on the multi-bit CA bus), since the CA input depends on the commands and addresses being sent by a host and/or memory controller. Therefore, to mitigate the potential worst-case power draw when CA bus ODT is enabled (e.g., a host issuing many commands/addresses with lots of zeros), conventional memory devices (e.g., DDR5 memory devices) and/or conventional memory modules (e.g., DDR5 DIMMs) may utilize a mitigation technique based on statically configured inversions of the CA input. That is, in the conventional mitigation technique, half of the memory devices on a memory module statically receive an inverted CA value over a first CA bus (i.e., each bit of the CA bus is inverted from the value sent by the host and/or memory controller), and are statically configured to invert the received CA value before using it (e.g., decoding a command and/or address based on the CA value). And in the conventional mitigation technique, the other half of the memory devices on the memory module statically receive the "true" (i.e., not inverted) CA value over a second CA bus, and are statically configured not to invert the received CA value before using it. By driving the true CA value to half of the memory devices on a memory module over one bus and driving the inverted CA value to the other half of the memory devices on the memory module over another bus, then on average the number of CA bits on the memory module driven with a value of 0 should be reduced (e.g., halved). As a result, the conventional mitigation technique utilized by conventional memory devices and/or conventional memory modules reduces the average power draw caused by CA bus ODT. The conventional mitigation technique may be regarded as "static" in that the use of a true CA value and an inverted CA value is fixed at design-time (e.g., by the design of the memory module). For example, a conventional DDR5 DIMM may be designed to drive the true CA value (e.g., the value received from a memory controller and/or host) to half of the DDR5 memory devices on the DIMM over one CA bus and designed to drive the inverted CA value to the other half of the DDR5 memory devices on the DIMM over another CA bus. Further, each conventional DDR5 memory device may receive a conventional CAI input that indicates whether the corresponding CA bus input is inverted, where the CAI input has a fixed value (e.g., tied to logical 1 or logical 0 by the design of the DIMM).

As memory device speeds increase (e.g., with the adoption of DDR6 memory modules and memory devices), it can be increasingly challenging to achieve the signal integrity needed to support those speeds. One known approach to improve signal integrity, therefore supporting faster device speeds, is to use lower resistances for ODT. However, lowering the resistances for ODT increases the power drawn, since the current drawn by a terminating resistor is inversely proportional to the terminating resistor's resistance (e.g., as the resistance decreases, the current increases). As a result, conventional mitigation techniques, which reduce power by statically driving an inverted CA value to half of the memory devices and statically driving a true CA value to the other half of the memory devices on a memory module, may not be sufficient. It would therefore be advantageous to be able to further reduce the power draw attributed to ODT as ODT resistances decrease.

Accordingly, described herein are memory systems (e.g., memory controllers, memory modules, and/or memory devices) with dynamic CAI. Like conventional memory systems, memory systems with dynamic CAI utilize inverted values on a CA bus, and associated signaling, to reduce the power draw caused by ODT. However, unlike conventional memory systems, in which the use of inverted values on CA buses is fixed (e.g., based on the design of a conventional memory module), memory systems with dynamic CAI may determine during operations whether or not to utilize inverted values on a CA bus depending on the true CA value for each operation. As described herein, the memory system with dynamic CAI can receive a CA value associated with an operation to be performed by the memory system (e.g., as part of a host request), evaluate the number of 1s and 0s in the CA value (e.g., on a bus CA [13:0], how many bits contain a 1 and how many bits contain a 0), and determine whether to use the CA value from the host (e.g., the true CA value) or an inverted value (e.g., the inverted CA value) to send to the memory devices. The determination to use the true CA value or the inverted CA value for sending to the memory devices can be based on which is advantageous, from a power perspective, for the type of ODT being used. With VDD-based ODT (in which it is advantageous to send 1s), the memory system may send the inverted CA value when the true CA value has more 0s than 1s (e.g., in a 14-bit CA value, 8 bits have the value 0), and otherwise may send the true CA value (e.g., in a 14-bit CA value, 7 or fewer bits have the value 0). In doing so, the memory systems with dynamic CAI advantageously transmit values over CA buses with a preferred balance of bits (e.g., more 1s than 0s when using VDD-based ODT), thereby improving power.

In various embodiments of the memory system with dynamic CAI, different system components that are part of a communication path from a host to the memory devices (e.g., a memory controller coupled to the host, and/or a memory module component such as an RCD) may be responsible for evaluating the true CA value generated by a host and transmitting the true CA value or inverted CA value, as well as associated signaling. For example, the memory controller can receive the true CA value (e.g., from the host) and transmit the true CA value or the inverted CA value over one or more CA buses to the memory modules of the memory system. As a further example, the RCD of each memory module can receive the true CA value (e.g., from the memory controller) and transmit the true CA value or the inverted CA value to the memory devices of the memory module over one or more CA buses of the memory module. As described herein, the memory system component (e.g., the memory controller and/or RCD) can include a dynamic CAI control circuit, which evaluates the true CA value, generates the inverted CA value, and transmits either the true CA value or the inverted CA value (e.g., to memory modules in the system and/or to memory devices on a memory module). The dynamic CAI control circuit can additionally generate and transmit a CAI signal, which can be used by memory devices to determine whether received CA values are true CA values (and can be decoded as-is) or are inverted CA values (and should be inverted prior to decode). It will be appreciated that in contrast to conventional systems (where the CAI input of each memory device is tied to a set value depending on the design of the memory module), the CAI signal received by the memory devices in the memory system with dynamic CAI is a dynamic signal that may change with each memory system operation.

In some embodiments, the memory system with dynamic CAI can support different modes that change the behavior of whether to drive true CA values or inverted CA values over CA buses. For example, in a first mode the system can drive the true CA value or inverted CA value over various CA buses in a static fashion (e.g., operating similarly to a conventional memory system). As a further example, in a second mode the system can dynamically drive the true CA value or inverted CA value over CA buses, depending on the true CA value (e.g., as described above). As described herein, a dynamic CAI control circuit can drive CA buses and/or CAI signals differently depending on the mode of the memory system. In some embodiments, different memory devices can receive different true and/or inverted CA values according to different modes.

In some embodiments, CAI signals associated with an operation (e.g., from a host request) may be fixed for one or more clock cycles and subsequently re-generated for a next operation. For example, certain operations are associated with a 2-cycle command, where some of the information for the operation is transmitted over a command/address bus in a first cycle, and other information for the operation is transmitted over the command/address bus in a second (e.g., next) cycle. In some embodiments, a CAI signal generated based on the value of the command/address bus during the first cycle of a 2-cycle command will maintain the same value (e.g., inverted or non-inverted) for the second cycle of the 2-cycle command (even though the command/address value will likely change in the second cycle). Similarly, in some embodiments, CAI signals associated with an operation are adjusted to account for a 2N mode, which enables the system to provide more setup and hold on the command/address bus. In 2N mode, the second half of a command associated with an operation may be received at a later cycle (e.g., two cycles after the first half of the command, instead of one cycle after the first half of the command), and CAI signals may be held accordingly until the next operation.

FIG. 1 illustrates a simplified block diagram schematically illustrating a memory device 100 in accordance with embodiments of the present technology. The memory device 100 may include an array of memory cells, such as memory array 150. The memory array 150 may include a plurality of banks (e.g., banks 0-15 in the example of FIG. 1), and each bank may include a plurality of word lines (WL), a plurality of bit lines (BL), and a plurality of memory cells arranged at intersections of the word lines and the bit lines. The selection of a word line WL may be performed by a row decoder 140, and the selection of a bit line BL may be performed by a column decoder 145. Sense amplifiers (SAMP) may be provided for corresponding bit lines BL and connected to at least one respective local input/output (IO) line pair (LIOT/B), which may in turn be coupled to at least one respective main IO line pair (MIOT/B), via transfer gates (TG), which can function as switches.

The memory device 100 may employ a plurality of external terminals that include command and address terminals coupled to a command bus and an address bus to receive command signals CMD and address signals ADDR, respectively. Although FIG. 1 illustrates an embodiment of the memory device with separate command and address terminals coupled to a command bus and an address bus, it will be appreciated that embodiments of the memory device may employ a command/address terminal, coupled to a shared command/address bus, to receive command/address signals CA. The memory device may additionally include a command/address inversion terminal to receive a command/address inversion signal CAI. The memory device may further include a chip select terminal to receive a chip select signal CS, clock terminals to receive clock signals CK and CKF, data clock terminals to receive data clock signals WCK and WCKF, data terminals DQ, RDQS, DBI (for data bus inversion function), and DMI (for data mask inversion function), power supply terminals VDD, VSS, VDDQ, and VSSQ, and on-die termination terminal(s) ODT.

The command signals and address signals (or, in certain embodiments, command/address signals) may be received by an address/command input circuit 105, which may perform certain processing of the signals before they are provided to other circuits/components of the memory device 100. For example, the address/command input circuit may include a CA invert circuit 175, which provides to the other circuits/components of the memory device the received command signals and address signals, or alternatively provides to the other circuits/components inverted command signals and inverted address signals. The CA invert circuit can determine whether to provide the received or inverted signals based on the signal CAI, provided by the command/address inversion terminal. For example, a value of 1 on the CAI signal may cause the CA invert circuit to provide the inverted signals, and a value of 0 on the CAI signal may cause the CA invert circuit to provide the received signals. As illustrated in FIG. 1, the CA invert circuit can include a two-to-one (2:1) multiplexor, in which one multiplexor input is coupled to the received command signals and address signals, the other multiplexor input is coupled to the inverted command signals and inverted address signals (e.g., generated by the CA invert circuit), the multiplexor select is coupled to the CAI signal, and the multiplexor output is coupled to outputs of the address/command input circuit (e.g., to be provided to other circuits/components of the memory device). It will be appreciated that in embodiments of the memory device in which command/address signals are provided by a command/address terminal (e.g., instead of or in addition to separate command signals and address signals), the command/address signals may be processed by the address/command input circuit and the CA invert circuit in the same manner as described above with respect to the command signals and address signals.

The command terminals and address terminals may be supplied with an address signal and a bank address signal from outside. The address signal and the bank address signal supplied to the address terminals can be transferred, via the address/command input circuit 105, to an address decoder 110. As described above, the address/command input circuit may invert the address signal and bank address signal, supplied from the external terminals, before transferring them to the address decoder. The address decoder 110 can receive the address signals and supply a decoded row address signal (XADD) to the row decoder 140, and a decoded column address signal (YADD) to the column decoder 145. The address decoder 110 can also receive the bank address portion of the ADDR input and supply the decoded bank address signal (BADD) and supply the bank address signal to both the row decoder 140 and the column decoder 145.

The command and address terminals may be supplied with command signals CMD, address signals ADDR, and chip select signals CS from a memory controller. The command signals may represent various memory commands from the memory controller (e.g., including access commands, which can include read commands and write commands). The select signal CS may be used to select the memory device 100 to respond to commands and addresses provided to the command and address terminals. When an active CS signal is provided to the memory device 100, the commands and addresses can be decoded and memory operations can be performed. The command signals CMD may be provided as internal command signals ICMD to a command decoder 115 via the address/command input circuit 105. As described above, the address/command input circuit may invert the command signals CMD, supplied from the external terminals, before providing them as internal command signals ICMD to the command decoder. The command decoder 115 may include circuits to decode the internal command signals ICMD to generate various internal signals and commands for performing memory operations, for example, a row command signal to select a word line and a column command signal to select a bit line. The internal command signals can also include output and input activation commands, such as clocked command CMDCK (not shown in FIG. 1).

The command decoder 115, in some embodiments, may further include one or more registers for tracking various counts or values (e.g., counts of refresh commands received by the memory device 100 or self-refresh operations performed by the memory device 100). In some embodiments, a subset of registers may be referred to as mode registers and configured to store user-defined variables to provide flexibility in performing various functions, features, and modes.

When a read command is issued to a bank with an open row and a column address is timely supplied as part of the read command, read data can be read from memory cells in the memory array 150 designated by the row address (which may have been provided as part of the Activate command identifying the open row) and column address. The read command may be received by the command decoder 115, which can provide internal commands to an IO circuit 160 so that read data can be output from the data terminals DQ, RDQS, DBI, and DMI via read/write amplifiers (RW AMP) 155 and the IO circuit 160 according to the RDQS clock signals. The read data may be provided at a time defined by read latency information (RL) that can be programmed in the memory device 100, for example, in a mode register. The read latency information RL can be defined in terms of clock cycles of the CK clock signal. For example, the read latency information RL can be a number of clock cycles of the CK clock signal after the read command is received by the memory device 100, when the associated read data is provided.

When a write command is issued to a bank with an open row and a column address is timely supplied as part of the write command, write data can be supplied to the data terminals DQ, DBI, and DMI according to the WCK and WCKF clock signals. The write command may be received by the command decoder 115, which can provide internal commands to the IO circuit 160 so that the write data can be received by data receivers in the IO circuit 160 and supplied via the IO circuit 160 and the read/write amplifiers 155 to the memory array 150. The write data may be written in the memory cell designated by the row address and the column address. The write data may be provided to the data terminals at a time that is defined by write latency WL information. The write latency WL information can be programmed in the memory device 100, for example, in a mode register. The write latency WL information can be defined in terms of clock cycles of the CK clock signal. For example, the write latency information WL can be a number of clock cycles of the CK signal after the write command is received by the memory device 100 when the associated write data is received.

The power supply terminals may be supplied with power supply potentials VDD and VSS. These power supply potentials VDD and VSS can be supplied to an internal voltage generator circuit 170. The internal voltage generator circuit 170 can generate various internal potentials VPP, VOD, VARY, VPERI, and the like based on the power supply potentials VDD and VSS. The internal potential VPP can be used in the row decoder 140, the internal potentials VOD and VARY can be used in the sense amplifiers included in the memory array 150, and the internal potential VPERI can be used in many other circuit blocks.

The power supply terminal may also be supplied with power supply potential VDDQ. The power supply potential VDDQ can be supplied to the IO circuit 160 together with the power supply potential VSS. The power supply potential VDDQ can be the same potential as the power supply potential VDD in an embodiment of the present technology. The power supply potential VDDQ can be a different potential from the power supply potential VDD in another embodiment of the present technology. However, the dedicated power supply potential VDDQ can be used for the IO circuit 160 so that power supply noise generated by the IO circuit 160 does not propagate to the other circuit blocks.

The on-die termination terminal(s) may be supplied with an on-die termination signal ODT. The on-die termination signal ODT can be supplied to the IO circuit 160 to instruct the memory device 100 to enter an on-die termination mode (e.g., to provide one of a predetermined number of impedance levels at one or more of the other terminals of the memory device 100).

The clock terminals and data clock terminals may be supplied with external clock signals and complementary external clock signals. The external clock signals CK, CKF, WCK, WCKF can be supplied to a clock input circuit 120. The CK and CKF clock signals can be complementary, and the WCK and WCKF clock signals can also be complementary. Complementary clock signals can have opposite clock levels and transition between the opposite clock levels at the same time. For example, when a clock signal is at a low clock level, a complementary clock signal is at a high level, and when the clock signal is at a high clock level, the complementary clock signal is at a low clock level. Moreover, when the clock signal transitions from the low clock level to the high clock level, the complementary clock signal transitions from the high clock level to the low clock level, and when the clock signal transitions from the high clock level to the low clock level, the complementary clock signal transitions from the low clock level to the high clock level.

Input buffers included in the clock input circuit 120 can receive the external clock signals. For example, when enabled by a CKE signal from the command decoder 115, an input buffer can receive the CK and CKF clock signals and the WCK and WCKF clock signals. The clock input circuit 120 can receive the external clock signals to generate internal clock signals ICLK. The internal clock signals ICLK can be supplied to an internal clock circuit 130. The internal clock circuit 130 can provide various phase- and frequency-controlled internal clock signals based on the received internal clock signals ICLK and a clock enable signal CKE from the command decoder 115. For example, the internal clock circuit 130 can include a clock path (not shown in FIG. 1) that receives the internal clock signal ICLK and provides various clock signals to the command decoder 115. The internal clock circuit 130 can further provide IO clock signals. The IO clock signals can be supplied to the IO circuit 160 and can be used as timing signals for determining output timing of read data and input timing of write data. The IO clock signals can be provided at multiple clock frequencies so that data can be output from and input to the memory device 100 at different data rates. A higher clock frequency may be desirable when high memory speed is desired. A lower clock frequency may be desirable when lower power consumption is desired. The internal clock signals ICLK can also be supplied to a timing generator 135, and thus various internal clock signals can be generated.

Figure 2:
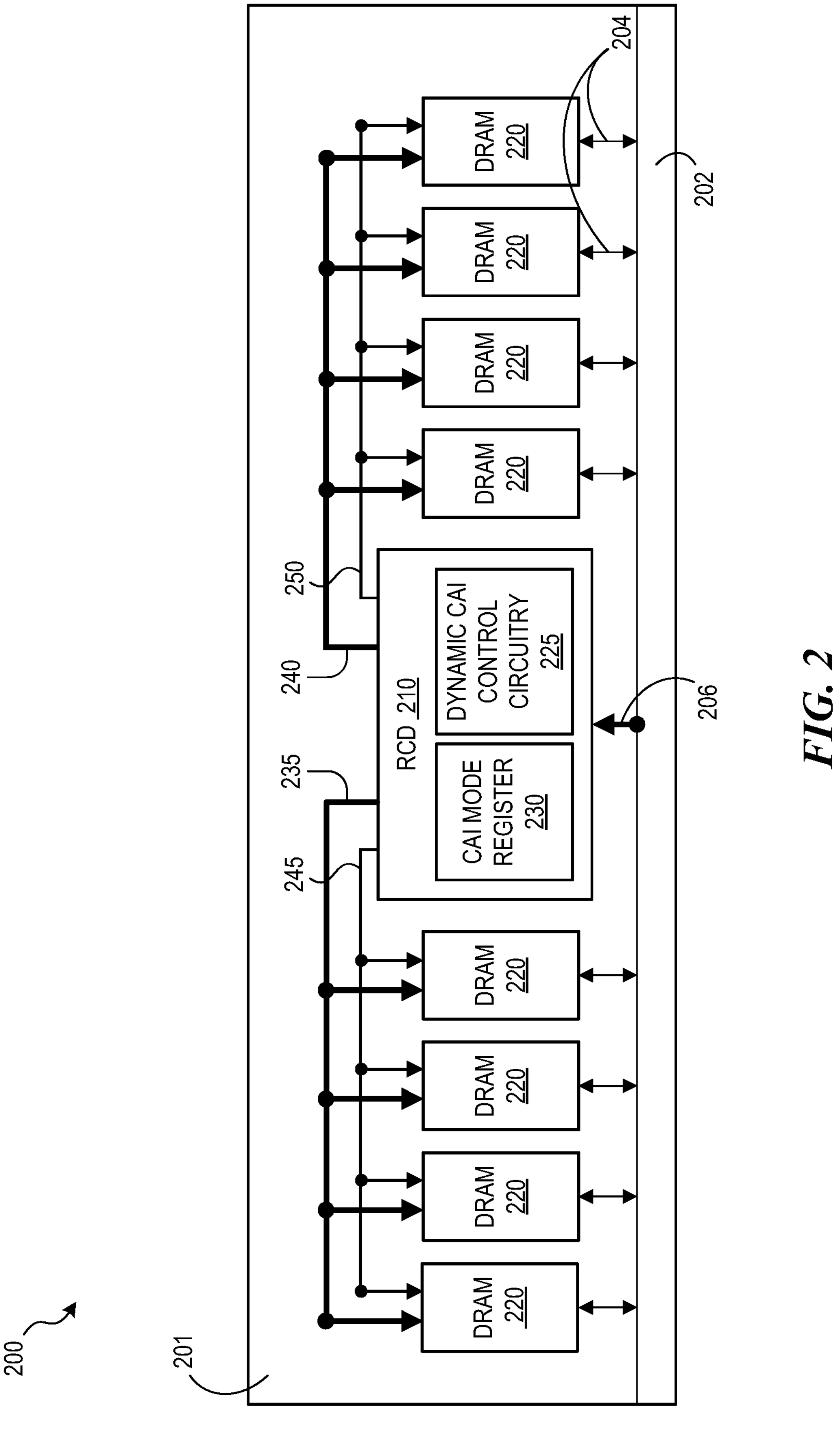
FIG. 2 schematically illustrates a dual in-line memory module (DIMM), with logic to control command/address bus inversion, in accordance with an embodiment of the present technology.

FIG. 2 schematically illustrates a dual in-line memory module (DIMM) 200, with logic to control command/address bus inversion, in accordance with an embodiment of the present technology. The DIMM 200 includes a plurality of DRAM 220 (e.g., memory devices, memory dies, memory chips, memory packages, or the like). For example, one or more of the DRAM 220 can be a memory device 100 illustrated in FIG. 1. The DIMM 200 includes an edge connector 202 along an edge of a substrate 201 (e.g., a printed circuit board (PCB) or the like) of the DIMM 200 for connecting a data bus 204 and a service bus 206 (illustrated in bold lines) to a host device (e.g., via a memory controller). The data bus 204 connects the DRAM 220 to the edge connector 202 and receives data signals from and transmits data signals to a connected host during memory access operations (e.g., reads and writes). The service bus 206 includes electrical connections configured to communicate information associated with the data communicated over the data bus 204. For example, the service bus 206 can include a command/address bus. The command/address bus can include information used by the DIMM 200 to perform the memory access operations and other operations, including command information and address information.

The DIMM 200 can further include control circuitry, such as an RCD 210. The RCD 210 can include circuitry configured to receive a command/address bus from the service bus 206 and can generate one or more DRAM-side command/address buses for the DRAM 220. The RCD 210 can present a predictable electrical load (e.g., for matching impedance, reactance, capacitance, etc.) to the host device and/or memory controller and can re-drive the DRAM-side command/address buses to the DRAM 220, which helps enable higher densities and increase signal integrity. The RCD 210 may also buffer the command/address buses provided by the host, and then transmit the buffered signals as DRAM-side command/address buses to the DRAM 220. In other words, the DIMM 200 may be a registered DIMM (RDIMM) and/or a load-reduced DIMM (LRDIMM).

Circuitry of the RCD 210 can include dynamic CAI control circuitry 225. The dynamic CAI control circuitry 225 can be configured to evaluate the command/address signals on the command/address bus (e.g., received via service bus 206 from the host device and/or memory controller) and determine whether to transmit the received command/address signals or inverted command/address signals on the one or more DRAM-side command/address buses for the DRAM 220. As described herein, the dynamic CAI control circuitry can make the determination based on the number of 1s and/or the number of 0s in the received command/address signals and/or the type of ODT used by the DIMM 200. For example, if the DIMM uses VDD-based ODT, the dynamic CAI control circuitry can transmit inverted command/address signals if there are more 0s than 1s in the received command/address signals. As a further example, if the DMM uses VSS-based ODT, the dynamic CAI control circuitry can transmit inverted command/address signals if there are more 1s than 0s in the received command/address signals. The determination by the dynamic CAI control circuitry may be further based on mode information stored in a CAI mode register 230. For example, if the CAI mode register indicates a first mode, the dynamic CAI control circuitry can transmit true or inverted command/address signals based on the counting of 1s and 0s described above. As a further example, if the CAI mode register indicates a second mode, the dynamic CAI control circuitry may transmit true command/address signals or inverted command/address signals to different DRAM in a fixed manner while the second mode is active. The dynamic CAI control circuitry can also generate one or more CAI signals, which indicate whether or not a set of corresponding command/address signals have been inverted. As described herein, each DRAM can include circuitry that determines whether to use (e.g., decode) received command/address signals as-is, or whether to invert the received signals (e.g., to logically undo inversion done by the RCD), based on a received CAI signal.

The RCD 210 can transmit command/address signals over one or more DRAM-side command/address buses to the DRAM 220. It will be appreciated that it may be advantageous for the DIMM 200 to include multiple command/address buses, over which different command/address signals from the RCD are transmitted to the DRAM, to enable transmitting inverted command/address signals to some DRAM and non-inverted command/address signals to other DRAM (e.g., in the second mode described above). For example, as illustrated in FIG. 2, the DIMM can include DRAM-side command/address buses CA-left 235 and CA-right 240, serving the left-side DRAM and the right-side DRAM of the DIMM, respectively. Similarly, the DIMM can include CAI-left 245 and CAI-right 250, which indicate whether the corresponding DRAM-side command/address bus contains inverted command/address signals. In the embodiment illustrated in FIG. 2, therefore, the RCD can transmit inverted or non-inverted command/address signals to the left side DRAM of the DIMM and independently transmit inverted or non-inverted command/address signals to the right side DRAM of the DIMM. Although in some instances the RCD will transmit the same (e.g., inverted or non-inverted) command/address signals over both the left and right command/address buses (e.g., when whether or not to invert is based on the number of 1s and 0s in the command/address signals received from the host), in other instances the RCD will transmit either inverted or non-inverted signals over the different buses (e.g., in a mode where inversion or not is fixedly configured for different DRAM, such as in conventional DIMMs).

Although FIG. 2 illustrates an embodiment of the DIMM 200 with two DRAM-side command/address buses (e.g., CA-left 235 and CA-right 240) and corresponding CAI signals (e.g., CAI-left 245 and CAI-right 250), it will be appreciated that in embodiments the DIMM can include fewer or more DRAM-side command/address buses and corresponding signaling. For example, in some embodiments, the DIMM includes a single command/address bus and CAI signal generated by the RCD 210 and transmitted to all DRAM 220 on the DIMM. In some embodiments, the DIMM includes four DRAM-side command/address buses and signals. For example, the DIMM can include two rows of DRAM 220 and four DRAM-side command/address buses and CAI signals corresponding to the top-left, top-right, bottom-left, and bottom-right DRAM. It will be appreciated that the DRAM-side command/address buses and CAI signals can be associated with other arrangement of DRAM. For example, in a DIMM with two rows of DRAM, a first DRAM-side command/address bus could be associated with all top DRAM and a second DRAM-side command/address bus could be associated with all bottom DRAM. Similarly, DRAM on the front and back of the substrate 201 can be associated with the same or different DRAM-side command/address buses.

Figure 3:
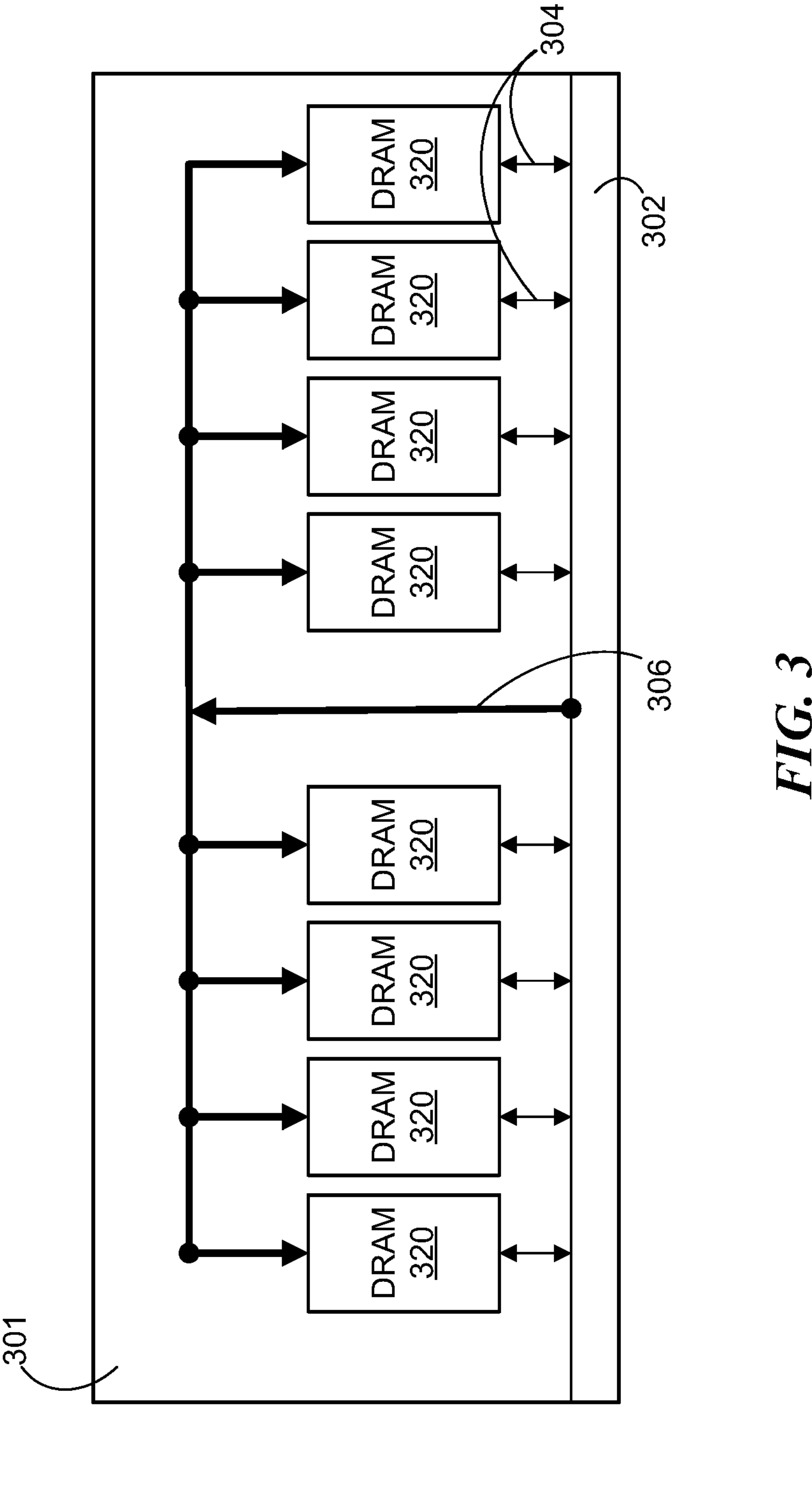
FIG. 3 schematically illustrates a DIMM in accordance with an embodiment of the present technology.

FIG. 3 schematically illustrates a DIMM 300 in accordance with an embodiment of the present technology. The DIMM 300 includes a plurality of DRAM 320 (e.g., memory devices, memory dies, memory chips, memory packages, or the like). For example, one or more of the DRAM 320 can be a memory device 100 illustrated in FIG. 1. The DIMM 300 includes an edge connector 302 along an edge of a substrate 301 (e.g., a PCB or the like) of the DIMM 300 for connecting a data bus 304 and a service bus 306 (illustrated in bold lines) to a host device (e.g., via a memory controller). The data bus 304 connects the DRAM 320 to the edge connector 302 and receives data signals from and transmits data signals to a connected host during memory access operations (e.g., reads and writes). The service bus 306 connects the DRAM 320 to the edge connector 302 and includes electrical connections configured to communicate information associated with the data communicated over the data bus 304. For example, the service bus 306 can include a command/address bus. The command/address bus can include information used by the DIMM 300 to perform the memory access operations and other operations, including command information and address information. As a further example, the service bus 306 can include a command/address inversion signal, which indicates whether the command/address bus includes the true information, or whether the bus includes the information in inverted form. In some embodiments, the service bus 306 is driven by a memory controller coupled to the DIMM 300, where the memory controller determines whether to send true or inverted information of the command/address bus portion of the service bus. The memory controller can drive the command/address inversion signal accordingly. As described herein, each DRAM can include circuitry that determines whether to use (e.g., decode) the received command/address bus as-is, or whether to invert the received bus (e.g., to logically undo inversion done by a memory controller), based on the received command/address inversion signal.

Although FIG. 3 illustrates an embodiment of the DIMM 300 with a single service bus 306, it will be appreciated that other embodiments of the DIMM 300 may include multiple service buses (e.g., a first service bus 306-1, a second service bus 306-2, etc.), each with its own command/address bus and/or command/address inversion signal driven by a host and/or memory controller. Alternatively, embodiments of the DIMM 300 may include multiple command/address buses and/or command/address inversion signals (e.g., received via edge connector 302), each driven by a host and/or memory controller, while the DIMM includes only a single service bus 306 corresponding to the other portions of the service bus. In embodiments of the DIMM 300 with multiple command/address buses and/or command/address inversion signals, different DRAM 320 can be driven by different pairs of buses and signals. For example, the left DRAM 320 may be driven by a first command/address bus and a first command/address inversion signal, and the right DRAM 320 may be driven by a second command/address bus and a second command/address inversion signal. The different command/address buses and command/address inversion signals may be driven independently of one another by a host and/or memory controller so that, for example, some DRAM receive an inverted command/address bus and some DRAM receive a non-inverted command/address bus (e.g., in a mode in which the system is configured to operate similarly to a conventional system). In some embodiments, the DIMM receives multiple command/address inversion signals, and one command/address bus, from the host and/or memory controller. In said embodiments, circuitry on the DIMM (not shown) generates an inverted command/address bus and transmits the received command/address bus and generated inverted command/address bus to different DRAM corresponding to the multiple received command/address inversion signals.

Figure 4:
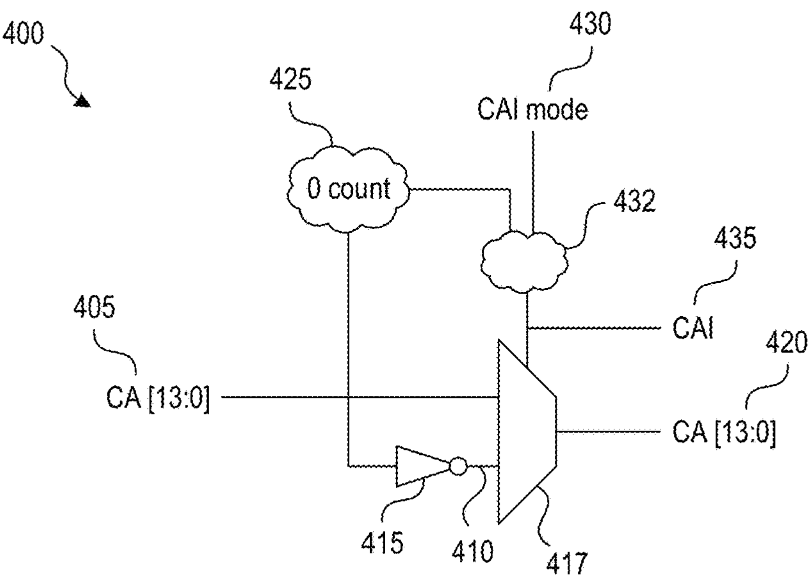
FIG. 4 is a simplified block diagram schematically illustrating a dynamic command/address inversion (CAI) control circuit, in accordance with an embodiment of the present technology.

FIG. 4 is a simplified block diagram schematically illustrating a dynamic CAI control circuit 400, in accordance with an embodiment of the present technology. As described herein, the CAI control circuit 400 can be configured to determine whether a command/address value, generated by a host as part of a request to perform an operation in a memory system, should be transmitted in inverted form to memory devices of the memory system. In some embodiments, the CAI control circuit 400 can be implemented within a memory controller coupled to the host, within memory modules of the memory system (e.g., an RCD, or other logic, of each memory module), or within other memory system components that are part of a communication path from the host to the memory devices.

The CAI control circuit 400 receives as an input a CA bus 405, over which is transmitted the "true" command/address value (e.g., the value generated by a host in association with a memory operation). Although FIG. 4 illustrates an embodiment of the CAI control circuit 400 in which the input CA bus 405 is 14 bits (e.g., CA [13:0]), it will be appreciated that in embodiments the input CA bus may be wider (e.g., more bits) or narrower (e.g., fewer bits).

The CAI control circuit 400 generates an inverted CA bus 410, from the input CA bus 405, using one or more inverters 415. In some embodiments of the CAI control circuit 400, the inverters 415 perform a bitwise operation in which each bit of the input CA bus 405 is inverted to generate the inverted CA bus 410. The CAI control circuit 400 then transmits either the value of the input CA bus 405 or the value of the inverted CA bus 410 over output CA bus 420 (using multiplexor 417). As described herein, the output CA bus 420 can be coupled to one or more memory devices of the memory system. For example, in embodiments in which the CAI control circuit is implemented in an RCD or other logic of a memory module, the output CA bus 420 may be transmitted to one or more memory devices on the memory module.

To determine whether to transmit the true or inverted CA value over output CA bus 420 (e.g., generate a control signal for the multiplexor 417), the CAI control circuit 400 can be configured to count the number of 1s or 0s in the true CA value on the input CA bus 405. FIG. 4 illustrates an embodiment of the CAI control circuit 400 configured to count the number of 0s in the true CA value (e.g., using 0 count circuit 425), but it will be appreciated that additional and/or other evaluations may be performed. For example, embodiments of the CAI control circuit 400 may count the number of 1s. The CAI control circuit 400 can also be configured to receive as an input a CAI mode 430, which indicates a configuration mode of the memory system. For example, a first value on the CAI mode 430 may indicate that inverted CA values should be transmitted based on the number of 1s and/or 0s in the true CA values, and a second value on the CAI mode 430 may indicate that whether to use inverted CA values is fixed. The CAI mode 430 can be received, for example, from a mode register. The CAI control circuit 400 can include control logic 432, which evaluates the result of the 0 count circuit 425 and CAI mode 430 to determine operation. For example, the control logic 432 can be configured to generate an output that will cause the multiplexor 417 to select the inverted CA bus 410 when the true CA value has more 0s than 1s and dynamic CAI is enabled. The control logic 432 output can also drive output CAI 435 of the CAI control circuit 400. As described herein, the output CAI 435 can be transmitted to one or more memory devices to indicate whether the corresponding output CA bus 420 has an inverted value (and therefore should be inverted as part of or prior to a decode operation by the memory device).

The CAI control circuit 400 can additionally include one or more state-saving components (e.g., flip-flops, not shown) to maintain the output CAI 435 for multiple cycles. The CAI control circuit 400 can be configured to update the flip-flops with a new output of the control logic 432, or hold the presently stored value (e.g., for at least one additional clock cycle) based on the control logic 432 or other logic of the CAI control circuit. For example, the CAI control circuit 400 can be configured to hold the output CAI 435 for an additional cycle if the CAI control circuit detects that the input CA bus 405 has a value indicating a multi-cycle command (e.g., a 2-cycle command). As a further example, the CAI control circuit 400 can be configured to hold the output CAI 435 for additional cycles based on whether the input CA bus 405 has a value indicating a multi-cycle command and whether the memory system is operating in a 2N mode. That is, in both 1N mode and 2N mode, the first half of the command is sampled on the clock edge during which the chip select is active (e.g., the rising edge or falling edge of the clock). In 1N mode, the second half of the command is sampled on the next rising or falling clock edge. In 2N mode, the second half of the command is sampled two clocks after the first half. Accordingly, the CAI control circuit 400 may hold a value for output CAI 435 for one additional cycle (e.g., a two-cycle command in 1N mode), for two additional cycles (e.g., a two-cycle command in 2N mode), etc.

Figure 5:
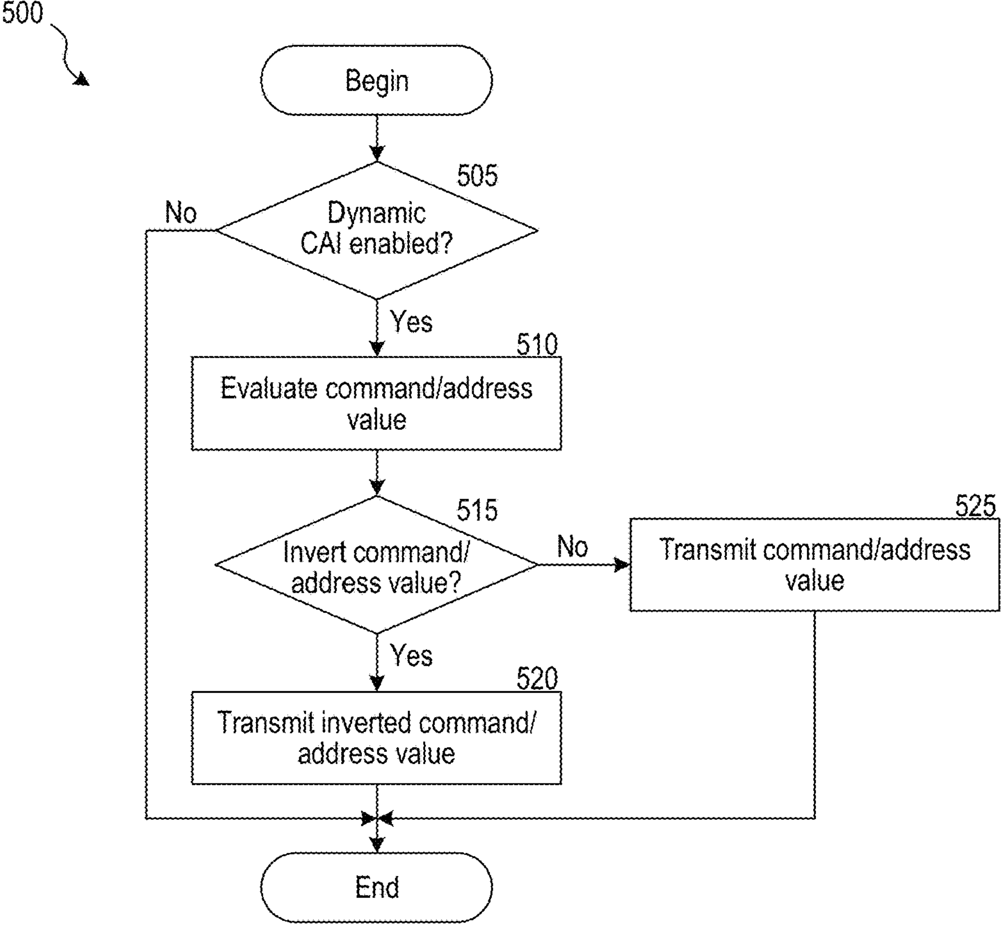
FIG. 5 is a flow diagram illustrating a process for performing dynamic CAI, in accordance with an embodiment of the present technology.

FIG. 5 is a flow diagram illustrating a process 500 for performing dynamic CAI, in accordance with an embodiment of the present technology. Aspects of the process 500 can be performed, for example, by the DIMM 200 of FIG. 2, by the dynamic CAI control circuit 400 of FIG. 4, by a memory controller, or a combination thereof.

The process 500 begins at decision block 505, where the process determines whether dynamic CAI is enabled. The determination can be based, for example, on a mode register or other configuration information of a memory system. If at decision block 505 the process determines that dynamic CAI is enabled, processing continues to block 510. Otherwise, the process ends.

At block 510, the process evaluates a command/address value. The command/address value can, for example, be received from a host and characterize a memory operation to be performed per host request. The evaluation can include, for example, evaluating the number of 1s and/or 0s in a binary representation of the command/address value.

At decision block 515, the process determines whether to invert the command/address value. The determination can be based, for example, on the number of 1s and/or number of 0s in the binary representation of the command/address value. For example, the decision block 515 may determine to invert the command/address value if its binary representation includes more 0s than 1s. If the decision block 515 determines to invert the command/address value, processing continues to block 520. Otherwise, processing continues to block 525.

At block 520, the process transmits the inverted command/address value, for example, to memory devices of the memory system. The process may additionally transmit a signal indicating that the command/address value being transmitted is an inverted value. The process then ends. Otherwise, at block 525 the process transmits the (non-inverted) command/address value to memory devices of the memory system. The process then ends.

Figure 6:
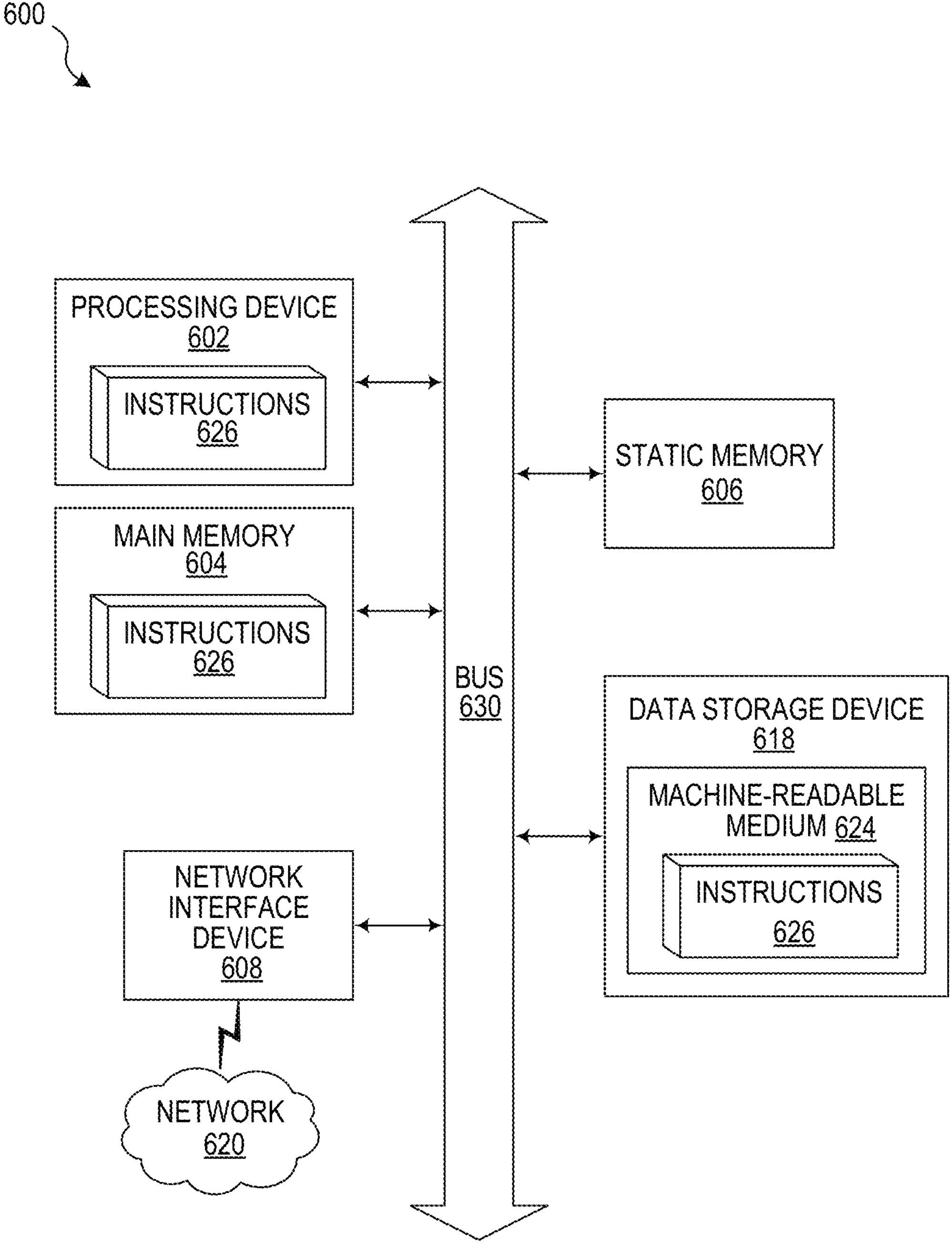
FIG. 6 is a block diagram of an example computer system in accordance with an embodiment of the present disclosure.

FIG. 6 illustrates an example machine of a computer system 600 within which a set of instructions for causing the machine to perform any one or more of the methodologies discussed herein can be executed. In alternative embodiments, the machine can be connected (e.g., networked) to other machines in a LAN, an intranet, an extranet, and/or the internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630. In accordance with one aspect of the present disclosure, the main memory 604 can dynamically perform inversion of command/address information received from, e.g., the processing device 602.

The processing device 602 represents one or more general-purpose processing devices such as a microprocessor, a central processing unit, or the like. More particularly, the processing device can be a complex instruction set computing (CISC) microprocessor, a reduced instruction set computing (RISC) microprocessor, a very long instruction word (VLIW) microprocessor, a processor implementing other instruction sets, or a processor implementing a combination of instruction sets. The processing device 602 can also be one or more special-purpose processing devices such as an application specific integrated circuit (ASIC), a field programmable gate array (FPGA), a digital signal processor (DSP), a network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media.

While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine, which instructions cause the machine to perform any one or more of the methodologies of the present disclosure. The term "machine-readable storage medium" shall accordingly be taken to include, but not be limited to, solid-state memories, optical media, and magnetic media.

The devices discussed herein, including a memory device, may be formed on a semiconductor substrate or die, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate or sub-regions of the substrate may be controlled through doping, using various chemical species including, but not limited to, phosphorus, boron, or arsenic. Doping may be performed during the initial formation or growth of the substrate, by ion-implantation, or by any other doping means.

The functions described herein may be implemented in hardware, software executed by a processor, firmware, or any combination thereof. Other examples and implementations are within the scope of the disclosure and appended claims. Features implementing functions may also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, the terms "vertical," "lateral," "upper," "lower," "above," and "below" can refer to relative directions or positions of features in the semiconductor devices in view of the orientation shown in the figures. For example, "upper" or "uppermost" can refer to a feature positioned closer to the top of a page than another feature. These terms, however, should be construed broadly to include semiconductor devices having other orientations, such as inverted or inclined orientations where top/bottom, over/under, above/below, up/down, and left/right can be interchanged depending on the orientation.

It should be noted that the methods described above describe possible implementations, and that the operations and the steps may be rearranged or otherwise modified and that other implementations are possible. Furthermore, embodiments from two or more of the methods may be combined.

From the foregoing, it will be appreciated that specific embodiments of the invention have been described herein for purposes of illustration, but that various modifications may be made without deviating from the scope of the invention. Rather, in the foregoing description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with memory systems and devices are not shown, or are not described in detail, to avoid obscuring other aspects of the technology. In general, it should be understood that various other devices, systems, and methods in addition to those specific embodiments disclosed herein may be within the scope of the present technology.

I claim:

1. A memory module comprising:

a plurality of memory devices having termination circuitry;

a command/address (CA) input; and a dynamic command/address inversion (CAI) control circuit, the dynamic CAI control circuit configured to:

evaluate the CA input;

generate, based on the evaluation of the CA input and the termination circuitry of the plurality of memory devices, a CA output, wherein the CA output comprises a value of the CA input or an inverted value of the CA input such that the CA output lowers a power consumption of the termination circuitry of the plurality of memory devices;

generate a CAI output, wherein the CAI output indicates whether the CA output comprises the inverted value of the CA input; and transmit the CA output and the CAI output to the plurality of memory devices.

2. The memory module of claim 1, wherein the CA input comprises a plurality of bits, and wherein the evaluation of the CA input comprises determining a number of CA input bits having a binary 0 value.

3. The memory module of claim 2, wherein the CA input is 14 bits.

4. The memory module of claim 2, wherein the evaluation of the CA input further comprises determining whether more than half of the CA input bits have a binary 0 value.

5. The memory module of claim 1, wherein the memory module further comprises a mode register configured to store a CAI mode, and wherein generating the CA output is based further on the CAI mode.

6. The memory module of claim 5, wherein the memory module further comprises a second plurality of memory devices, and wherein the CAI control circuit is further configured to:

determine that the CAI mode corresponds to a fixed mode;

generate a second CA output, wherein the second CA output comprises the inverted value of the CA input;

generate a second CAI output, wherein the second CAI output indicates an inverted value; and transmit the second CA output and the second CAI output to the second plurality of memory devices.

7. The memory module of claim 6, wherein the CA output comprises the value of the CA input and wherein the CAI output indicates a non-inverted value.

8. The memory module of claim 1, wherein at least one of the plurality of memory devices is configured to perform an operation according to an inversion of the CA output based on the CAI output.

9. The memory module of claim 1, wherein the memory module further comprises a clock input, and wherein the CAI control circuit is further configured to:

determine whether the value of the CA input indicates a 2-cycle command; and maintain the CAI output until a first rising edge of the clock input if it is determined that the value of the CA input indicates a 2-cycle command.

10. The memory module of claim 9, wherein the CAI control circuit is further configured to:

determine whether the memory module is configured to operate in a 2N mode, wherein N represents a number or a count of clock cycles between command portions; and maintain the CAI output until a second rising edge of the clock input if it is determined that the value of the CA input indicates a 2-cycle command and the memory module is configured to operate in the 2N mode.

11. The memory module of claim 1, wherein the termination circuitry includes one of a VDD-based on-die termination (ODT) or a VSS-based ODT that draw different amounts of power depending on bit values carried on the CA output.

12. The memory module of claim 1, wherein the termination circuitry comprises on-die termination (ODT) having a resistance coupled to one of a VDD node or a VSS node, and wherein the CAI control circuit is further configured to select the value of the CA input or the inverted value of the CA input based on a power drawn by the ODT.

13. A memory module comprising:

a first plurality of memory devices, wherein the first plurality of memory devices have a first on-die termination (ODT) that is one of a VDD-based ODT or a VSS-based ODT;

a second plurality of memory devices, wherein the second plurality of memory devices have a second ODT that is one of a VDD-based ODT or a VSS-based ODT;

a command/address (CA) input;

a first command/address inversion (CAI) input; and a second CAI input;

wherein the memory module is configured to:

determine a first ODT setting for the first plurality of memory devices;

determine a second ODT setting for the second plurality of memory devices;

generate a first CA output, comprising a value of the CA input or an inverted value of the CA input, based on the first CAI input and the first ODT setting;

generate a second CA output, comprising the value of the CA input or the inverted value of the CA input, based on the second CAI input and the second ODT setting;

transmit the first CA output to the first plurality of memory devices; and transmit the second CA output to the second plurality of memory devices.

14. The memory module of claim 13, wherein the CA input is 14 bits.

15. The memory module of claim 13, wherein:

the first ODT setting for the first plurality of memory devices draws a first amount of power; and the second ODT setting for the second plurality of memory devices draws a second amount of power independently of the first amount of power.

16. A method comprising:

receiving, at a memory controller, a request from a host device coupled to the memory controller;

generating, in response to the received request, a command/address (CA) value characterizing the request, wherein the CA value comprises a plurality of bits;

determining a number of CA value bits having a binary 0 value to determine whether transmitting the CA value or an inverted CA value reduces power consumption associated with termination circuitry of a memory module;

generating, based on the determination and based on power characteristics of the termination circuitry, a CA output, wherein the CA output comprises the CA value or the inverted CA value; and transmitting the CA output to the memory module coupled to the memory controller.

17. The method of claim 16, wherein the CA output comprises the inverted CA value when it is determined that there are more CA value bits having a binary 0 value than there are CA value bits having a binary 1 value.

18. The method of claim 16, wherein the CA output comprises the inverted CA value when it is determined that there are more CA value bits having a binary 1 value than there are CA value bits having a binary 0 value.

19. The method of claim 16, further comprising:

generating a command/address inversion (CAI) output that indicates whether the CA output is based on the CA value or the inverted CA value; and transmitting the CAI output to the memory module coupled to the memory controller.

20. The method of claim 16, wherein the termination circuitry includes one of a VDD-based on-die termination (ODT) or a VSS-based ODT that draw different amounts of power depending on bit values carried on the CA output.

* * * * *